UNITED STATES PATENT OFFICE.

CHARLES C. AVERILL, OF TREES, LOUISIANA.

PROCESS OF MAKING LAMPBLACK AND HYDROCHLORIC ACID.

1,238,734.

Specification of Letters Patent.

Patented Sept. 4, 1917.

No Drawing.

Application filed April 6, 1917. Serial No. 160,142.

*To all whom it may concern:*

Be it known that I, CHARLES C. AVERILL, a citizen of the United States, residing at Trees, in the parish of Caddo and State of Louisiana, have invented a certain new and useful Improvement in Processes of Making Lampblack and Hydrochloric Acid, of which improvement the following is a specification.

This invention relates to the manufacture of lamp-black and hydrochloric acid from natural gas or other hydrocarbons, and has for its object to provide an improved process by which substantially all of the carbon may be recovered in the form of lamp-black, and the hydrochloric acid resulting from the reaction may be collected and condensed.

Heretofore when lamp-black has been manufactured by burning natural gas or other hydrocarbons with a limited supply of air, the unconsumed carbon resulting from the action has been deposited upon iron troughs as lamp-black, but much of the carbon is wasted by escaping in the form of smoke or carbon dioxid. My improvement contemplates the saving and recovery of substantially all of the carbon, and it consists in burning natural gas or other hydrocarbons in a tight combustion chamber or furnace, from which air is entirely excluded, the combustion being supported by chlorin gas admitted to said chamber in the desired quantity. During this combustion, the hydrogen of the natural gas which may be indicated by the symbol, $CH_4$, combines with the chlorin, evolving heat and leaving the free carbon in the form of a dense smoke. This reaction may be represented by the following formula:

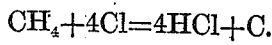

$$CH_4 + 4Cl = 4HCl + C.$$

The products of the combustion may be conveyed to a settling chamber where the carbon falls to the floor as lamp-black, and may be collected and removed by any suitable means, while the hydrochloric acid gas may be drawn off through a filter at the top of the settling chamber and then condensed in the usual way, as by passing the gas through a tower filled with broken stone or boulders and dripping water. Inasmuch as the reaction is complete, it will be seen that substantially all of the carbon from the natural gas will be liberated and recovered as lamp-black as it will not combine with the chlorin. The hydrogen, however, combines freely with the chlorin to produce hydrochloric acid.

My improved process may be carried out in a variety of ways, and in any suitable form of combustion and settling chamber.

Having now described my invention, what I claim as new and desire to secure by Letters Patent is:

1. The process of producing lamp-black which consists in burning a hydrocarbon, in an atmosphere of chlorin gas, collecting the carbon, and drawing off the hydrochloric acid.

2. The process of producing lamp-black which consists in burning natural gas in an atmosphere of chlorin gas, allowing the carbon to settle, and drawing off the hydrochloric acid.

3. The process of producing lamp-black which consists in burning a hydrocarbon in an atmosphere of chlorin gas, in a closed chamber from which air is excluded, allowing the carbon to settle, and drawing off the hydrochloric acid.

In testimony whereof I have hereunto set my hand.

CHARLES C. AVERILL.